A. J. UPHAM.
BARBED FENCE WIRE.
No. 181,608. Patented Aug. 29, 1876.
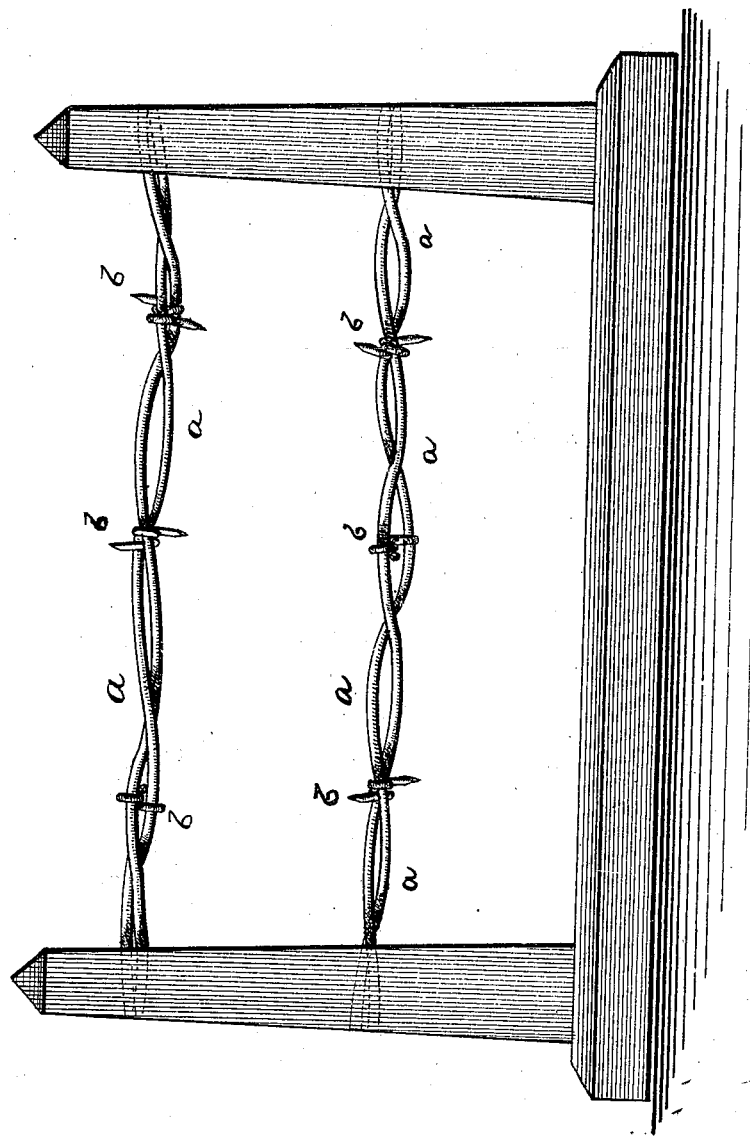

UNITED STATES PATENT OFFICE.

ANDREW J. UPHAM, OF STERLING, ILLINOIS.

IMPROVEMENT IN BARBED FENCE-WIRES.

Specification forming part of Letters Patent No. 181,608, dated August 29, 1876; application filed June 22, 1876.

*To all whom it may concern:*

Be it known that I, ANDREW J. UPHAM, of Sterling, in the county of Whitesides and State of Illinois, have invented certain new and useful Improvements in Barbed Fence-Wire; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to a peculiar method of fastening a barb upon two fence-wires, for the obvious purpose of preventing stock from crowding upon the fence made therewith.

Figure 1 is a side elevation of a section of fence embodying my invention.

The wires $a\ a$ are fence-wire, somewhat smaller than that ordinarily selected when but a single wire is used.

The mode of preparing my fence-wire is as follows: The wires $a\ a$ are run through a machine parallel to each other, and during their passage the barbs $b$ are, by the machine, fastened, as shown. After the fixing or clasping of the barbs, the wires $a\ a$ are twisted about each other, with the result as shown. While I place the barbs and twist the wires with a machine constructed for the purpose, the same result may be reached, with less rapidity, by hand.

The noticeable features and advantage of my mode of placing the barbs $b$ are that, by protruding the points of the barb from between the wires, each end or point of the barb is supported by the wires from being untwisted. And also, the barb being seated on both wires, in the manner mentioned, has the strength of resistance of both wires, and, in the event of one wire breaking, the barb will prevent the untwisting of the wires. By twisting the wires the barbs are alternated in a direction perpendicular to each other.

I am aware that barbed fence-wire is not new, and I do not claim the same broadly; but

I claim as my invention—

The wire barb $b$, in combination with the two wires $a\ a$, the barb being bent from the outside around each of the wires, with its points projected between the wires in opposite directions, as and for the purpose specified.

In testimony that I claim the foregoing as my own I affix my signature in presence of two witnesses.

ANDREW J. UPHAM.

Witnesses:
 D. BURD ROCK,
 H. C. WARD.